United States Patent [19]
Wizemann

[11] 3,716,682
[45] Feb. 13, 1973

[54] TURN SIGNAL SWITCH

[75] Inventor: Werner O. Wizemann, Michigan City, Ind.

[73] Assignee: Meridian Industries, Inc., Southfield, Mich.

[22] Filed: Aug. 26, 1971

[21] Appl. No.: 175,232

[52] U.S. Cl..............200/61.27, 340/81 F, 200/6 B
[51] Int. Cl..............................................H01h 3.16
[58] Field of Search....................200/61.27–61.38, 200/6 R, 6 A, 6 B, 6 BH, 6 BB, 6 C; 340/81, 81 F

[56] References Cited

UNITED STATES PATENTS

| | | | |
|---|---|---|---|
| 3,493,696 | 2/1970 | Rothweiler | 200/6 R X |
| 3,591,740 | 7/1971 | Kolster | 200/61.27 |
| 1,710,819 | 4/1929 | Griffin | 200/61.31 X |

*Primary Examiner*—Robert K. Schaefer
*Assistant Examiner*—M. Ginsburg
*Attorney*—McGlynn, Jr., Reising, Milton, Ethington, Adelman, Krass, Perry, Young, Thorper

[57] ABSTRACT

A heavy duty turn signal switch is disclosed for use in trucks and similar road vehicles. The turn signal switch is of the "hang-on" type (non-self cancelling and includes a hermetically sealed casing containing the switching mechanism. The switching mechanism comprises two rows of contact sets with each set being formed of flexible contact blades mounted in cantilever fashion on a printed circuit board. The contact sets are actuated by a barrel cam which is displaced by an operating lever between neutral left turn, right turn and hazard warning positions. The movement of the operating lever is indexed by a detent mechanism and a lockout arrangement is provided to avoid inadvertent movement to the hazard warning position.

7 Claims, 8 Drawing Figures

INVENTOR.
Werner O. Wizemann
BY
Barnard, McGlynn & Reising
ATTORNEYS

INVENTOR.
Werner O. Wizemann

INVENTOR.
Werner O. Wizemann

TURN SIGNAL SWITCH

This invention relates to turn signal switches for automotive vehicles and more particularly to heavy duty turn signal switches adapted for rugged service in trucks and similar road vehicles.

In many applications of vehicle turn signals, such as commercial and military vehicles the switch must be constructed to meet exacting specifications regarding reliability and long life in addition to resistance to a wide range of environmental conditions and ability to stand rough handling by the operator. In general these requirements have been met by a turn signal switch structure which comprises a sealed casing which contains switching contacts and actuators therefor of special construction. Such a turn signal switch is disclosed and claimed in U.S. Pat. No. 3,591,740 entitled Selector Switch Assembly granted on July 6, 1971 to Wilhelm K. Kolster and assigned to the same assignee as the subject invention.

One of the persistent problems in the manufacture of turn signal switches of the type described is that of reliability and long life of the switching contacts. A satisfactory solution to this problem is provided by the switch of the aforementioned Kolster patent in which spring loaded bridging contacts in the form of contact balls are provided in a movable carrier to selectively engage fixed contact elements on a printed circuit board. This construction is subject to disadvantage of difficulty in assembly and hence cost of manufacture. Furthermore, the contact arrangement is such that the contact elements are subject to mechanical wear due to the friction and loading and are subject to a degree of electrical pitting due to the make and break contact movement.

Accordingly, a principal object of this invention is to provide an improved turn signal switch of the type set forth in the above mentioned Kolster patent. More particularly, it is an object to provide an improved switching mechanism to enhance the reliability and lifetime of a turn signal switch with a design which is simple and economical to manufacture and service. In accordance with the invention this is accomplished by a switching mechanism including switch contact sets using flexible contact blades mounted on a circuit board for actuation by a barrel cam mounted in the casing for displacement by an external operating lever. The switch contact sets are preferably arranged in two rows extending axially in spaced relation along the barrel cam and disposed on opposite sides thereof. The contact sets each comprise a pair of flexible contact blades extending parallel to each other and perpendicularly from the circuit board and supported thereon by metal eyelets and electrically interconnected by printed circuit paths on the board. The barrel cam is provided with first and second cam lobe elements which engage first and second groups of contact sets when the operating lever is in right-turn and left-turn positions respectively. Additionally the operating lever may be moved to a hazard warning position which brings into play a third cam lobe element coacting with the groups of contact sets. At least one of the flexible contact blades of each set is provided with a cam follower element which coacts with the cam lobe element in such a way as to provide snap action of the switches. Additionally the operating lever is provided with a detent arrangement coordinated with the angular positions of the cam lobes to enhance the snap action effect in contact operation. The barrel cam arrangement with the two rows of switch contact sets enables a simplified circuit layout and switch actuation sequence for the selective operations of right-turn and left-turn and hazard warning signalling circuits, including the usual provision for the brake lamp circuits.

A more complete understanding of this invention may be obtained from the detailed description which follows taken with the accompanying drawings in which.

Figure 1:
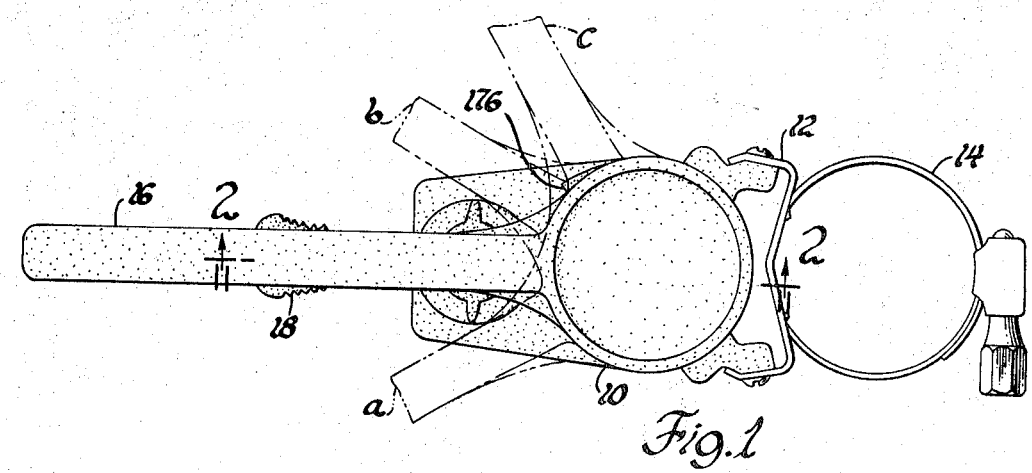
FIG. 1 is a plan view of the turn signal switch as it would be viewed by an operator and showing the selectable positions of the operating lever.

Referring now to the drawings; there is shown an illustrative embodiment of the invention in a turn signal switch, especially adapted for heavy duty applications in commercial and military vehicles. As shown in FIG. 1, the turn signal switch is of the type commonly referred to as the "hang on" type since it is self-contained and designed for installation on the steering column in convenient position for the vehicle operator. The turn signal switch is adapted for manual operation to a selected signalling position and for manual return to a neutral position. As illustrated the turn signal switch comprises a casing 10 which may be mounted by a bracket 12 and clamp 14 on the vehicle steering column not shown. An operating lever 16 extends from the casing 10 and is pivotally mounted thereon for rotation about an axis extending through the casing which in FIG. 1 is in a direction perpendicular to the plane of the paper. In FIG. 1 the operating lever 16 is shown in full lines in the neutral position, which is operative to enable energization of both brake signal lamps. The operating lever 16 is shown in phantom lines in left-turn position which, of course, is operative to energize the front and rear left-turn signal lamps and to disable the left brake lamp and enable the right brake lamp. The operating lever 16 is shown in phantom lines in the right-turn position b which is operative to energize the front and rear right turn signal lamps and to disable the right brake lamp and enable the left brake lamp. Also in FIG. 1 the lever 16 is shown in the hazard warning position c which, according to convention, is operative to energize the left front and rear and the right front and rear signal lamps and to disable both right and left brake lamps. The operating lever 16 is blocked from movement into the hazard warning position unless a lock release slide 18 is manually retracted by the vehicle operator.

Figure 2:
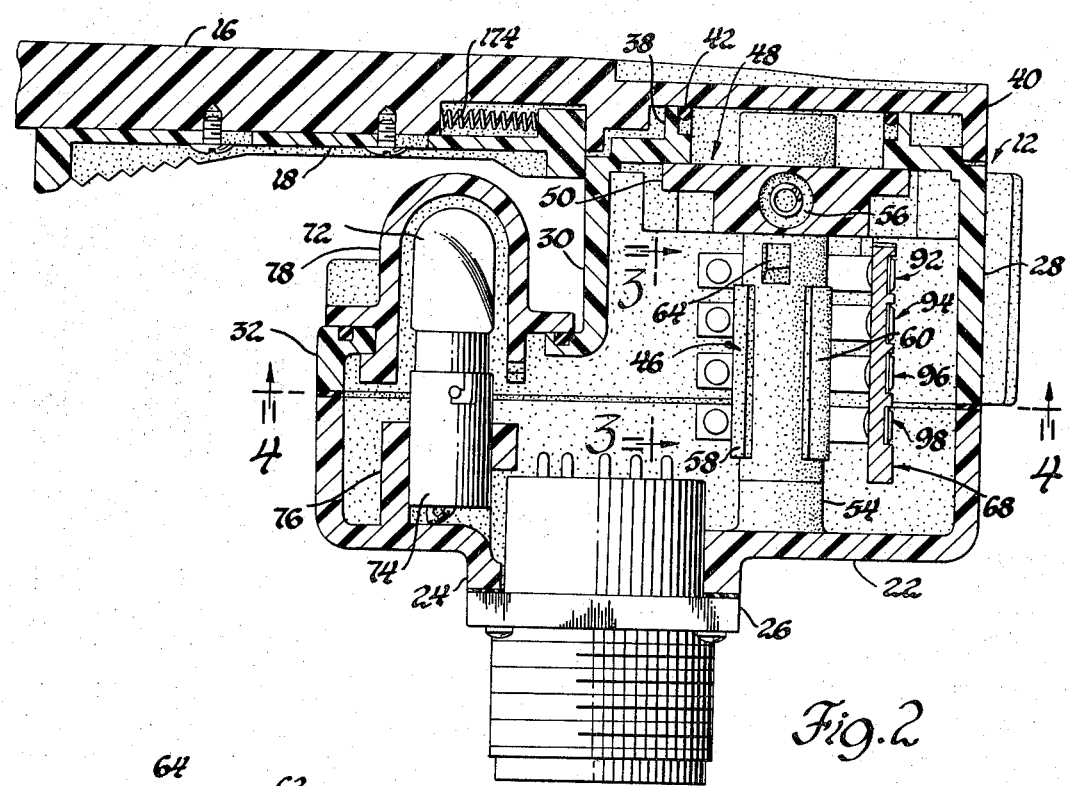
FIG. 2 is a sectional view taken on lines 2—2 of FIG. 1.
Figure 4:
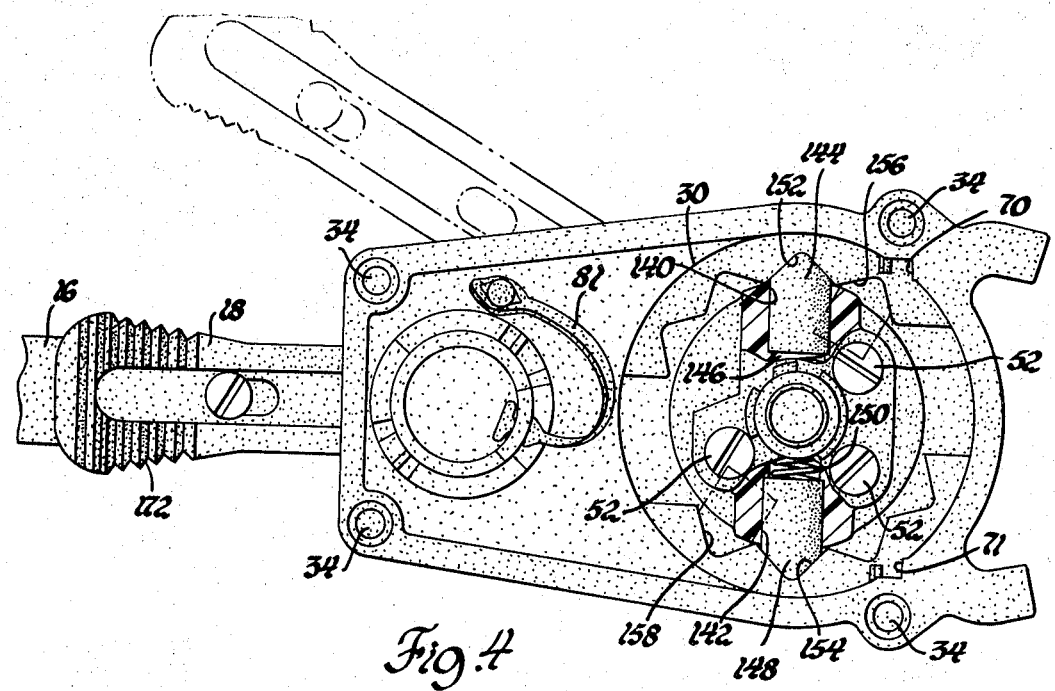
FIG. 4 is another sectional view taken on lines 4—4 of FIG. 2, showing the operating lever in neutral position and showing in phantom lines the operating lever in the right-turn position.

As shown in FIG. 2, the casing 12 comprises a lower body 22 of cup-like configuration with an open top and a closed bottom wall, except for an opening defined by an annular flange 24. An electrical connector 26 of the hermetically sealed type is mounted on the flange 24 by screw threaded fasteners and a suitable gasket to provide a sealed connection. The electrical connector 26 provides multiple circuit paths from the interior of the casing 12 to the signalling circuits of the vehicle. The casing 12 also includes an upper body 28 which is of inverted cup-like configuration with a tower portion 30 of circular cross-section and an extended base portion 32. The upper body 28 is open at the bottom and the peripheral wall thereof is seated upon the peripheral wall of the lower body 22 through a sealing gasket and the bodies are secured together by threaded fasteners in holes 34 (FIG. 4).

The upper body 28 of the casing is provided at the top of the tower portion 30 with an opening defined by an annular flange 38, upon which is mounted the hub 40 of the operating lever 16. It will be noted that a seal 42 suitably in the form of an o-ring and adapted for rotary motion is disposed between a shoulder on the flange 38 and the inner surface of the hub 40 of the operating lever.

Within the casing 12 a barrel cam 46 is fixedly mounted in depending relation on the hub 40 of the operating lever for rotation therewith. This mounting is provided by an integral hub 48 on the barrel cam with a flange 50 which overlaps the base of the annular flange 38 on the upper body. The hub 48 is secured to the hub 40 by screw threaded fasteners 52 which can be viewed in FIGS. 4 and 5. The barrel cam 46 extends from the inner surface of the hub 40 of the operating lever downwardly to a bearing member 54 of pedestal form which extends upwardly from the lower body 22.

The barrel cam 46 is provided with a detent mechanism 56 in the hub 48 and is also provided with cam lobes 58, 60, 62 and 64, all of which will be described in detail subsequently as a part of the switching mechanism. The switching mechanism also comprises a printed circuit board 68 which carries plural switch contact sets in operative relation to the barrel cam 46. The circuit board 68 is disposed, as shown in FIG. 2, in a plane parallel to the axis of the barrel cam 46 and is supported in the upper body 28 in a pair of oppositely disposed slots 70 and 71 (see FIG. 4) in the peripheral wall thereof and also by the lower body in a similar manner, the structure of which is not illustrated. Thus the circuit board with the integrally mounted switch contact sets mounted thereon may be slidably inserted into the upper body 28 for proper positioning relative to the barrel cam 46 prior to the attachment of the lower body 22. As mentioned, the switching mechanism, including the barrel cam and the printed circuit board with the switch contact sets mounted thereon will be described in detail below.

The casing 12 also accommodates a pilot lamp 72 used in a conventional manner for indicating the operating condition of the turn signal system. The pilot lamp socket 74 is mounted in a boss 76 in the lower body 22. A cover dome 78 over the pilot lamp 72 is attached by a bayonet connection on the base portion 32 of the upper body and is seated thereon through a suitable sealing gasket. The cover dome 78 is held in captive relation with the upper body by a flexible keeper strap 81, as shown in FIG. 4.

The casing 10, operating lever 16 and the barrel cam 46 including the hub 50 are all preferably formed of molded plastic material suitably a polycarbonate.

Figure 3:
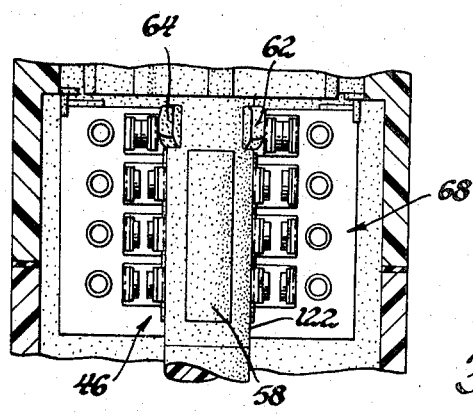
FIG. 3 is a sectional view taken on lines 3—3 of FIG. 2.
Figure 6:
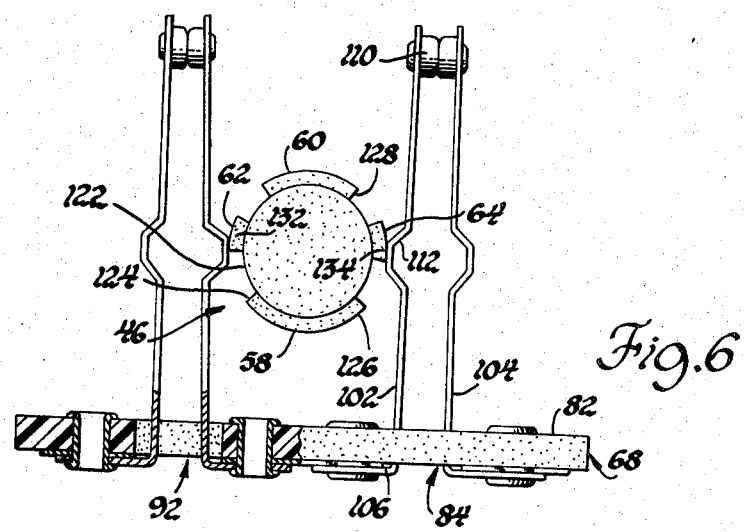
FIG. 6 shows a detail of the switching mechanism.
Figure 7:
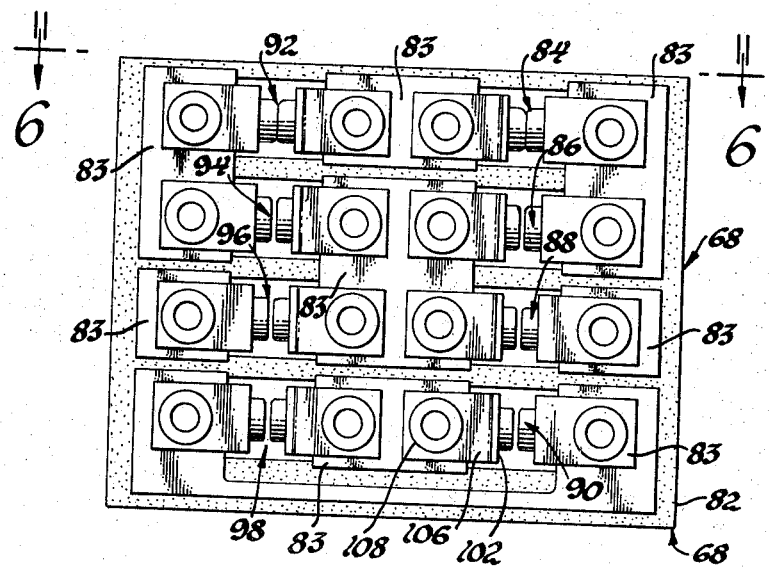
FIG. 7 shows details of the circuit board and switch contact sets thereon.

The switching mechanism including the printed circuit board 68 with the contact sets mounted thereon and the barrel cam 46 will now be described with reference to FIGS. 3, 6 and 7. The printed circuit board 68 comprises an insulating board or plate 82 on the back side of which is deposited a conductive circuit in a pattern depicted by the metallic areas 83 of FIG. 7. A first row of switch contact sets 84, 86, 88 and 90 is mounted on one side of the center of the board 82 and a second row of contact sets 92, 94, 96 and 98 is disposed on the other side of the center of the board 82. All of the contact sets are of the same construction and will be described with reference to the contact set 90 which comprises an inboard contact blade 102 and an outboard contact blade 104. Both blades may be of the same construction and are mounted in cantilever fashion on the board 82. The board is provided with a rectangular opening and the contact blade extends through the opening and terminates in a lateral foot portion 106 which overlies a conductive circuit path on the board an is secured thereto by a hollow rivet or eyelet 108 which extends through the foot portion and the board. The blade 102 extends in a direction perpendicular to the printed circuit board 68 and terminates in a free-end adjacent which is mounted a contact button 110. At an intermediate location the blade 102 is provided with a cam follower 112 in the form of an offset portion in the blade with a laterally extending shoulder portion adapted for engagement by the lobes on the barrel cam. The outboard contact blades, such as blade 104 need not be provided with the cam follower but for simplicity and economy of manufacture all blades may be identical. The contact blades are suitably formed of a spring metal such as a beryllium copper alloy. It is noted that the inboard contact blades, being actuable by the barrel cam, are regarded as movable contacts and the outboard contact arms are regarded as fixed contacts, even though they are intended to be subject to relatively small movement. It is noted that the contact set is closed by cam actuation which flexes the inboard contact blade outwardly so that the contact button thereof engages the contact button of the outboard blade which is displaced outwardly thereby to attain the desired degree of contact pressure. This arrangement avoids the need for precise positioning of the contacts in the assembly of the switching mechanism and still provides the desired contact engagement and separation. It is noted that by reason of a flexibility of the contact blades both the inboard and outboard blades spring back to their rest position when the blade is disengaged by the cam. Such movement of the contact blades provides a certain degree of wiping action between the contact buttons during the make and brake operations.

As mentioned above the switch contact sets on the printed circuit board 68 are actuated by the barrel cam 46 which was alluded to in the description of the assembly as shown in FIG. 2. As shown in greater detail in FIGS. 3 and 6, the barrel cam 46 comprises a cylindrical portion 122 provided with four axially extending cam lobes 58, 60, 62 and 64. The cam lobe 58 is long enough to span the switch contact sets 86, 88 and 90 and the oppositely disposed contact sets 94, 96 and 98. This cam lobe has an angular extent of approximately 120° and terminates at one side in a radial shoulder which forms a lobe element 124. The lobe 58 terminates at the other side in a similar radial shoulder which forms a lobe element 126. When the operating lever 16, and hence the cam 46, is rotated in a clockwise direction, as for signalling a right turn, the lobe element 124 will simultaneously engage the cam followers (such as follower 112) on the inboard contact blades of contact sets 94, 96 and 98. Similarly when the lever 16 and hence the cam 46 is rotated in a counterclockwise direction the lobe element 126 will simultaneously engage the cam followers on the inboard blades of the contact sets 86, 88 and 90 to close the switch contacts. The cam lobe 60 is also of an axial extent sufficient to span the contact sets 86, 88 and 90 and hence the opposed contact sets 94, 96 and 98. This lobe is of an angular extent of approximately 60° and terminates at one side in a radial shoulder with a lobe element 128. When the operating lever 16 is rotated in a clockwise direction to the hazard warning position the lobe element 124 will, in the manner just described, close the contact sets 94, 96 and 98 and hold them closed because of the angular extent of the lobe and the lobe element 128 of lobe 60 will engage the cam followers of the inboard blades of contact sets 86, 88 and 90 and close the contacts thereof, thereby closing the signalling circuits of both the right-turn and left-turn signal lamps.

The cam lobes 62 and 64 are adapted to control the brake lamp contact sets 84 and 92 in conjunction with the turn-signal contact sets 86, 88, 90, 94, 96 and 98. For this purpose the cam lobes 62 and 64 have an axial length such that they are disposed for operative engagement with only the cam followers on the inboard contact blades of the contact sets 84 and 92. The cam lobe 62 terminates in a radially extending shoulder with a lobe element 132 which is so positioned that it engages the cam follower on the inboard contact blade of contact set 92 when the operating lever and hence the cam is in its neutral position, thus holding the contact set closed. Similarly, the cam lobe 64 is provided with a lobe element 134 which engages the follower of the inboard contact blade of contact set 84 when the operating lever and the cam are in the neutral position, thus holding the contact set closed. This condition is illustrated in FIG. 6. When the operating lever 16 is rotated counterclockwise to signal a left turn the contact sets 86, 88 and 90 are closed as previously described and additionally the contact set 92 is held closed by the cam lobe 62 while the contact set 84 is allowed to open by the cam lobe 64. Similarly, when the operating lever is moved to the right turn position the contact sets 94, 96 and 98 are closed as previously described and additionally the contact set 84 is held closed by the cam lobe 64 while the contact set 92 is allowed to open by the cam lobe 62. When the operating lever is rotated further counterclockwise to the hazard warning position the contact sets 86, 88, 90, 94, 96 and 98 are closed as previously described and in this position the cam lobes 62, and 64, being of short angular extent, are rotated beyond engagement with the cam followers on the inboard contact blades of the contact sets 84 and 92, allowing both of these contact sets to open.

Figure 5:
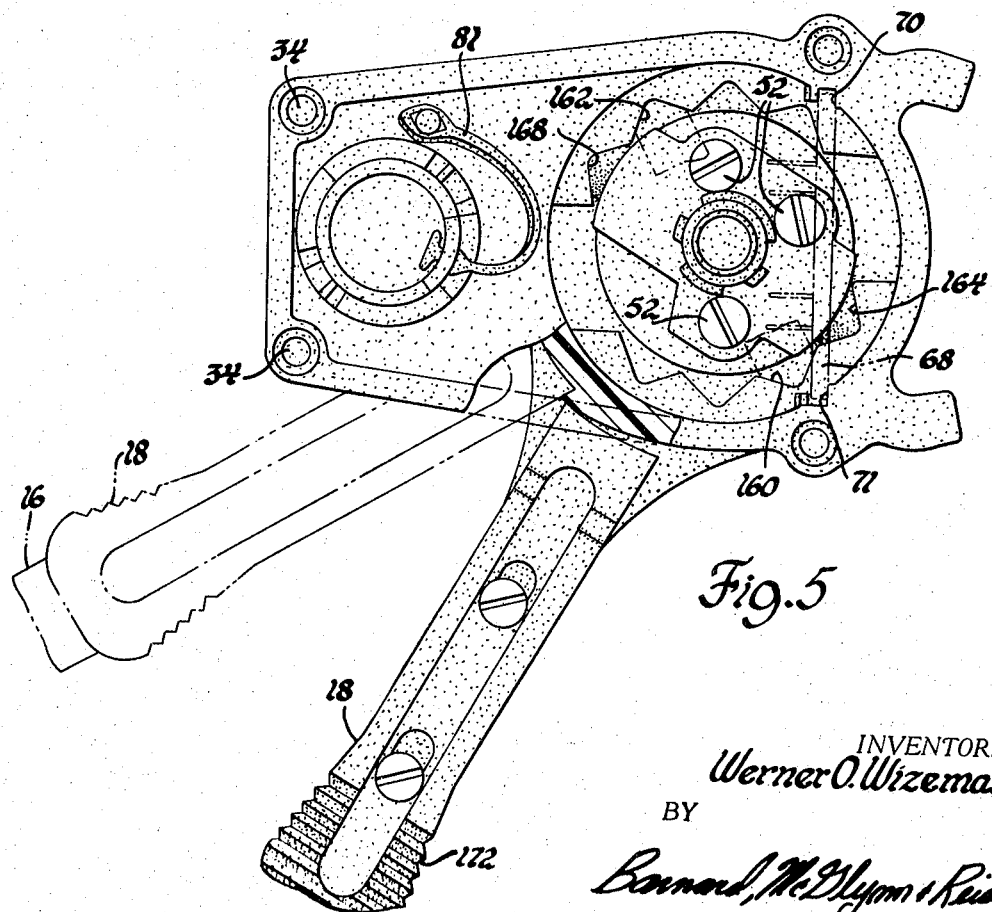
FIG. 5 is a view similar to FIG. 4 but showing the operating lever in the hazard warning position in full line and showing it in left-turn position in phantom lines.

As mentioned briefly above the barrel cam 46 is provided with a hub portion 48 which includes a detent mechanism 56. As shown in FIGS. 4 and 5 the hub 48 is provided with a pair of oppositely disposed radial bores 140 and 142. A plunger 144 is slidably disposed in the bore 140 and is urged outwardly by the helical spring 146. Similarly a plunger 148 is disposed in the bore 142 and is urged outwardly by a helical spring 150. Both plungers 144 and 148 are provided with wedge shaped outer ends which coact with the inner surface of the tower portion 30 of the upper body 28 in a manner to be described. As shown in FIG. 4, the inner surface of the tower portion 30 of the upper body defines a pair of radially extending recesses, 152 and 154, which are radially opposite each other and have a configuration corresponding to the wedge shaped end of the plungers 144 and 148. With the operating lever 16 in the neutral position, as illustrated in the full line drawing of FIG. 4, the plungers 144 and 148 are seated in the recesses 152 and 154 respectively. In a similar fashion recesses 156 and 158 are provided and correspond to the left turn position of the operating lever 16 as shown in phantom line in FIG. 4. Similarly, as shown in FIG. 5, recesses 160 and 162 are provided and correspond with the right turn position of the operating lever 16, as shown in the phantom lines. In a similar manner recesses 164 and 168 are provided for coaction with the plungers 144 and 148 respectively and correspond to the hazard warning position of the operating lever 16, as shown in full line. It is observed that the recesses just described constitute a continuous cam surface and, of course, the rotational effort applied manually to the operating lever 16 causes the plungers 144 and 148 to be pressed inwardly against the respective springs with the travel being sufficient that the operating lever is movable from one position to the next. In this movement, the spring loaded plungers and the cam surfaces interact to oppose movement of the lever away from the four designated positions until the intermediate position between the adjacent recesses in the cam surface is reached and then the force of the spring loaded plungers aids movement of the lever toward the next position. It is further noted that the lobe elements on the barrel cam 46 are located relative to the intermediate positions of the detent mechanism so that the action of the detent mechanism tends to aid the snap action of the contact sets.

To prevent the turn signal switch from being inadvertently moved into the hazard warning position by the operator, lockout means are provided which requires operation of the slide 18. The slide 18 is mounted on the operating lever 16 by a pin and slot connection and includes at the outer end a knurled handle 172 which the operator may grasp between this thumb and finger. The lockout slide 18 is biased inwardly by helical spring 174 so that the inner end thereof engages the outer surface of the tower 30. The outer surface of the tower 30 is generally cylindrical except for a one-way stop member 176 (FIG. 1) aligned with the slide 18 so as to prevent clockwise rotation of the operating lever 16 past the right turn position without retracting the slide 18. With the slide retracted the operating lever may be moved into the hazard warning position and it may be moved counterclockwise from the hazard warning position to any of the other positions without need for manually retracting a slide 18 by reason of the cam surface on the stop member 176.

Figure 8:
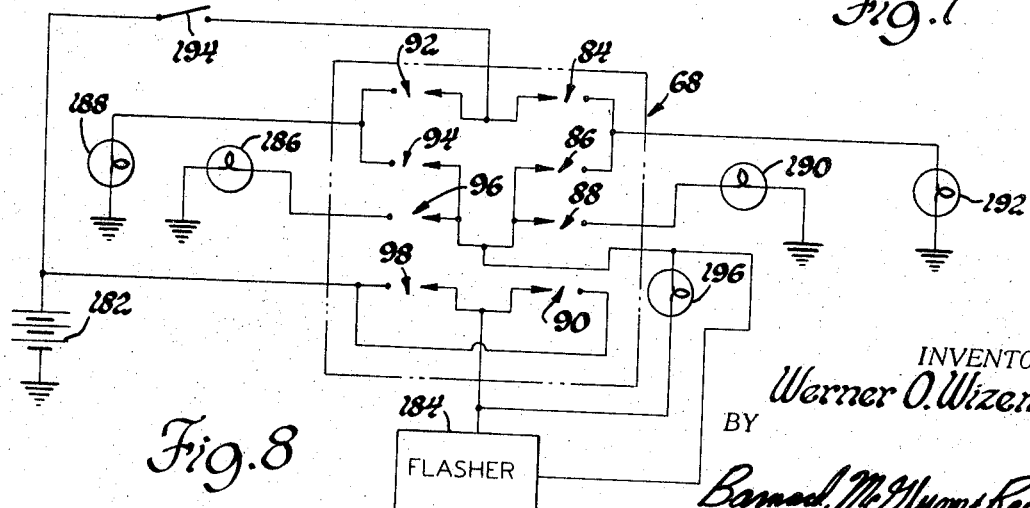
FIG. 8 is a schematic diagram of the electrical connections of the turn signal switch.

The turn signal switching mechanism as just described is adapted to be connected into a vehicle turn signal circuit as depicted in the schematic diagram of FIG. 8. The vehicle battery 182 has one terminal connected to ground and the other terminal connected to the outboard contact blades of contact sets 90 and 98 on the printed circuit board 68. The inboard contact blades of these contact sets are connected to the input of a flasher unit 184 which may be of conventional design to provide an intermittent output voltage from a direct voltage input. The output of the flasher is connected directly to the inboard contact blades of the contact sets 86, 88, 94 and 96. The left front turn signal lamp 190 is connected to the outboard contact blades of the set 88 and the left rear turn signal lamp 192 is connected to the outboard blade of the contact sets 84 and 86. The right front turn signal lamp 186 is connected to the out-board contact blade of the contact set 96 and the right rear turn signal lamp 188 is connected with the outboard contact blades of the contact sets 94 and 92. To provide for brake signalling the battery voltage is applied through a brake switch 194 to the inboard contact blades of contact sets 84 and 92.

In operation of the system all of the contact sets except 84 and 92 are in the open position when the operating lever 16 is in the neutral position. When a left turn is to be signalled the operating lever is moved counterclockwise to the left turn position and accordingly the barrel cam 46 is rotated so that the cam lobe element 126 closes contact sets 86, 88 and 90 which is effective to apply the battery voltage through the flasher 184 to the left front and left rear turn signal lamps 190 and 192 respectively. With the operating lever in this position the cam lobe 62 maintains contact set 92 closed while the cam lobe 64 allows the contact set 84 to open. In this switching condition the left rear turn signal lamp 192 is supplied with interrupted voltage from the flasher to provide a flashing signal and the right rear turn signal lamp 188 may be supplied with steady voltage from the battery through the brake signal switch 194 to indicate application of the vehicle brakes. In a similar manner, when the operating lever 16 is rotated clockwise to the right turn position contact sets 94, 96 and 98 are closed to apply the flasher output voltage to the right front and right rear turn signal lamps 186 and 188 respectively. In this condition contact set 84 is held closed by cam lobe 64 and contact set 92 is allowed to open by cam lobe 62. Thus the brake signal may be applied to the left rear lamp 192. With the turn signal lever 16 in the hazard warning position the cam lobe 58 closes contact sets 94, 96, and 98 and the cam lobe element 128 closes contact sets 86, 88 and 90. Accordingly, all four lamps are connected with the flasher output voltage. AT the same time cam lobes 62 and 64 allow contact sets 92 and 84 to open, thus interrupting the brake circuit. The pilot lamp 196 is connected directly across the flasher terminals to indicate the condition of the flasher circuits.

Although the description of this invention has been given with reference to a particular embodiment, it is not to be construed in the limiting sense. Many variations and modifications will now occur to those skilled in the art. For a definition of the invention reference is made to the appended claims.

The embodiments of the present invention in which an exclusive property or privilege is claimed are defined as follows:

1. A turn signal switch for automotive vehicles comprising a casing adapted to be fixedly mounted on the vehicle, an operating lever pivotally mounted on the casing for angular displacement about an axis extending through the casing, a circuit board with plural circuit paths thereon and being disposed within the casing adjacent and parallel to said axis, a first and second plurality of switch contact sets mounted on said board in spaced arrangement along said axis, each set including first and second contact support members with opposed contact elements thereon, said first contact support members being flexible, a barrel cam mounted in said casing for angular displacement about said axis with first and second cam lobe elements thereon engageable selectively with each of said first contact support members of a set to selectively close and open respective opposed contact elements, said operating lever being drivingly connected with said barrel cam for angular displacement thereof, detent means disposed between said casing and said lever and including means for holding said lever selectively in neutral, right-turn and left-turn positions, first and second groups of contact sets being electrically connected with respective electrical circuit paths on said board and being adapted to be connected with right-turn and left-turn signal circuits, respectively, the first and second cam lobe elements engaging the first and second group of contact sets, respectively, when said operating lever is in the right-turn and left-turn positions, respectively.

2. The invention as defined in claim 1 wherein said first contact support members comprise flexible contact blades and include cam follower elements and wherein said cam lobe elements include a substantially radially extending shoulder adapted to engage and disengage the follower elements to impart snap action to said switch contact elements.

3. The invention as defined in claim 2 wherein said detent means include a spring loaded plunger and a cam surface having recesses corresponding with said positions of the operating lever, said plunger and cam surface opposing movement of the lever away from said positions until an intermediate position is reached and aiding movement of the lever toward one of said positions after the intermediate position is reached, said cam lobe elements being located relative to said first contact blades and said intermediate positions so that said contact sets are operated with a snap action.

4. The invention as defined in claim 2 wherein said circuit board is a printed circuit board and metal rivets extending through the board and mounting said flexible contact blades thereon.

5. The invention as defined in claim 2 wherein said detent means also include means for holding said lever in a hazard warning position beyond one of said turn positions, said first and second group of contact sets being adapted to be connected with a hazard warning signal circuit and a third cam lobe element engaging said second group of contact sets when said lever is in the hazard warning position.

6. The invention as defined in claim 5 including a left and right brake switch contact sets and wherein said barrel cam includes fourth and fifth cam lobe elements thereon engaging the first contact blades respectively of the brake switch contact sets when said operating lever is in neutral position, is disengaged from one of said first contact blades when the lever is moved into the right turn or left-turn position, and is disengaged from both said first blades when the operating lever is in the hazard warning position.

7. The invention as defined in claim 6 wherein said circuit board is a printed circuit board and wherein a first oppositely disposed pair of contact sets has first blades connected together and second blades connected together through the printed circuit board for connection of a voltage source to a flasher unit, second and third oppositely disposed pairs of contact sets with one blade of each set connected together through the printed circuit board for connection to the flasher unit and the other blade of each set being connected respectively to terminals on the printed circuit board for connection respectively to left-front, left-rear, right-front and right-rear signals lamps, said brake contact sets having one blade of each set connected together through the printed circuit board for connection to a brake switch and the other blade of each set being connected respectively with terminals corresponding to the left-rear and right-rear lamps, said left brake switch contact set being actuated by its cam lobe element simultaneously with the actuation of the contact sets corresponding to the right-front and right-rear lamps by the cam lobe elements and the right brake switch contact set being actuated by its cam lobe element simultaneously with the actuation of the contact sets corresponding to the left-front and left-rear lamps by the cam lobe elements.

* * * * *